(12) United States Patent
Chen (10) Patent No.: US 8,908,358 B2
(45) Date of Patent: Dec. 9, 2014

(54) PROTECTION CASE FOR ELECTRONIC DEVICE

(75) Inventor: Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 301 days.

(21) Appl. No.: 13/587,977

(22) Filed: Aug. 17, 2012

(65) Prior Publication Data

US 2013/0153451 A1   Jun. 20, 2013

(30) Foreign Application Priority Data

Dec. 19, 2011   (CN) .......................... 2011 1 0426558

(51) Int. Cl.
*B65D 85/00* (2006.01)

(52) U.S. Cl.
USPC ............ 361/679.01; 361/679.09; 361/679.21; 174/50; 206/320

(58) Field of Classification Search
CPC .................. G06F 1/656; G06F 2200/1633
USPC .............................. 361/752; 206/320; 174/50
See application file for complete search history.

(56) References Cited

U.S. PATENT DOCUMENTS 7,267,550 B1 *   9/2007   Eckberg et al. ................. 439/65
7,495,895 B2 *   2/2009   Carnevali ................. 361/679.26

* cited by examiner

*Primary Examiner* — Robert J Hoffberg
*Assistant Examiner* — Mukund G Patel
(74) *Attorney, Agent, or Firm* — Novak Druce Connolly Bove + Quigg LLP (57) ABSTRACT

A protection case for protecting an electronic device is disclosed. The protection case includes a main body. The main body defines a receiving cavity for accommodating the electronic device and a plurality of connecting through holes for exposing a plurality of interface ports of the electronic device. The main body defines a number of grooves encircling the connecting through holes for receiving moisture in the air.

13 Claims, 7 Drawing Sheets

PROTECTION CASE FOR ELECTRONIC DEVICE

TECHNICAL FIELD

The disclosure generally relates to cases, and particularly to a protection case for an electronic device.

DESCRIPTION OF RELATED ART

An electronic device may be put in a case for avoiding dust and reducing collision damage. However, many other factors also have an effect on the electronic devices. For example, when the electronic device is placed in a humid environment, moisture in the atmosphere may cause damage to the electronic device.

Therefore, it is desirable to provide a protection case which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding portions throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
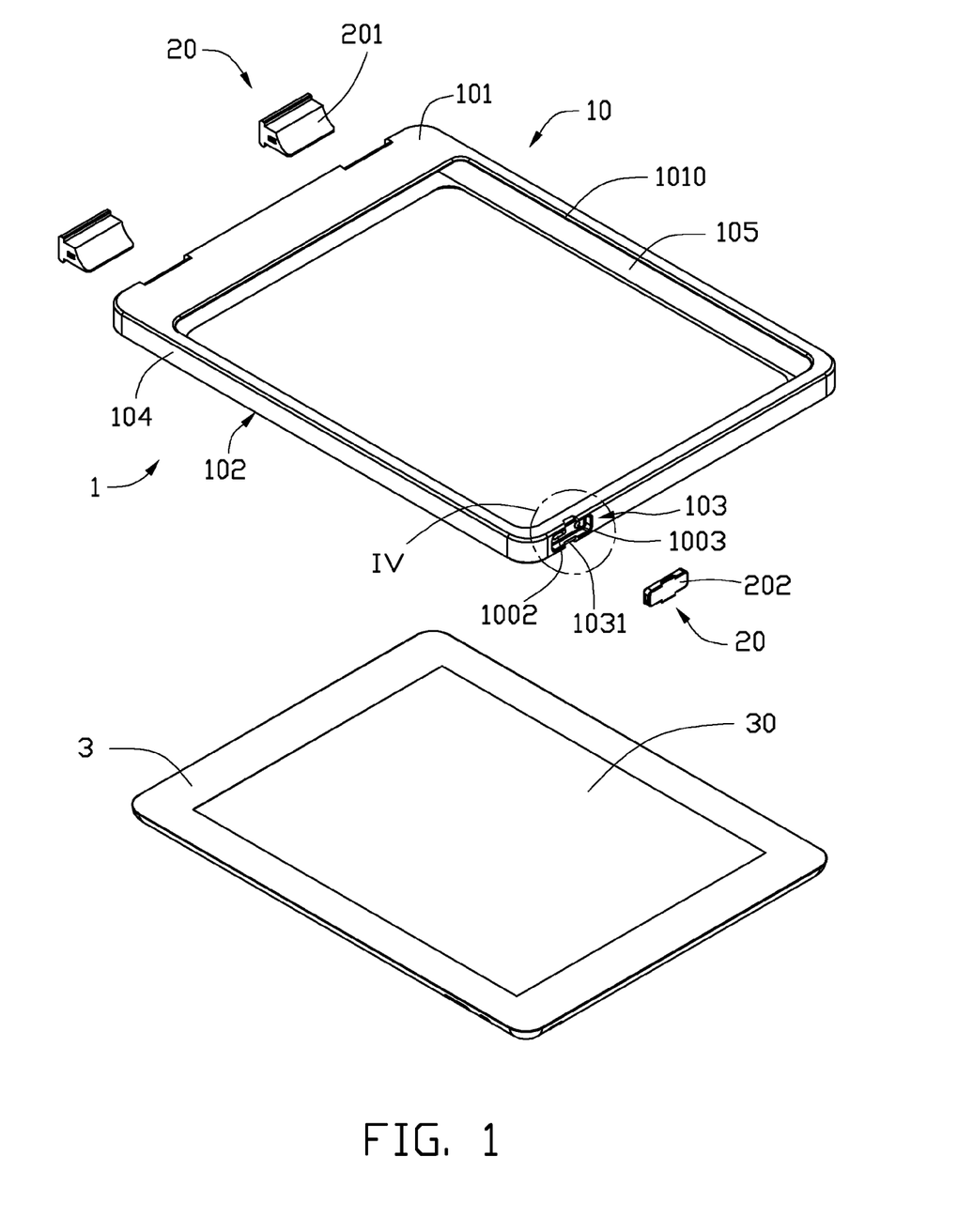
FIG. 1 is an isometric view of a protection case and an electronic device in accordance with a first embodiment of the present disclosure.
Figure 2:
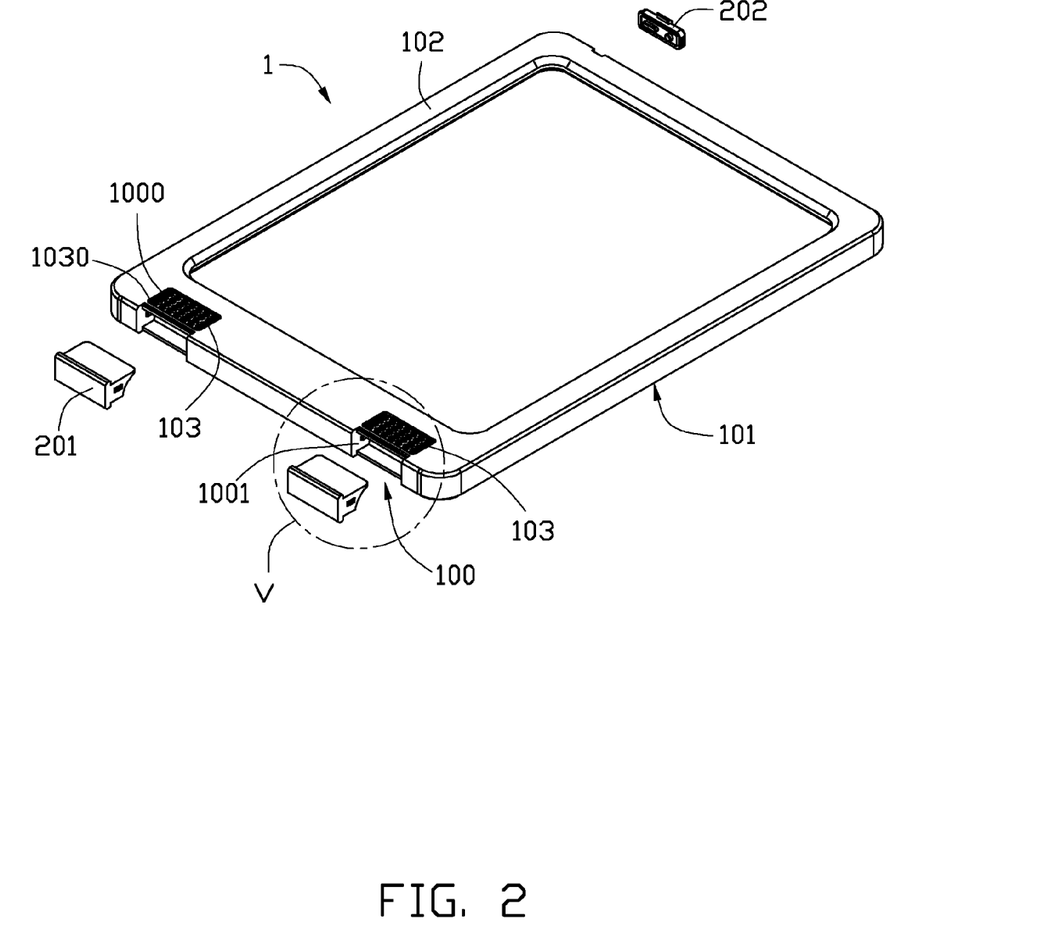
FIG. 2 is another isometric view of the protection case of FIG. 1.
Figure 3:
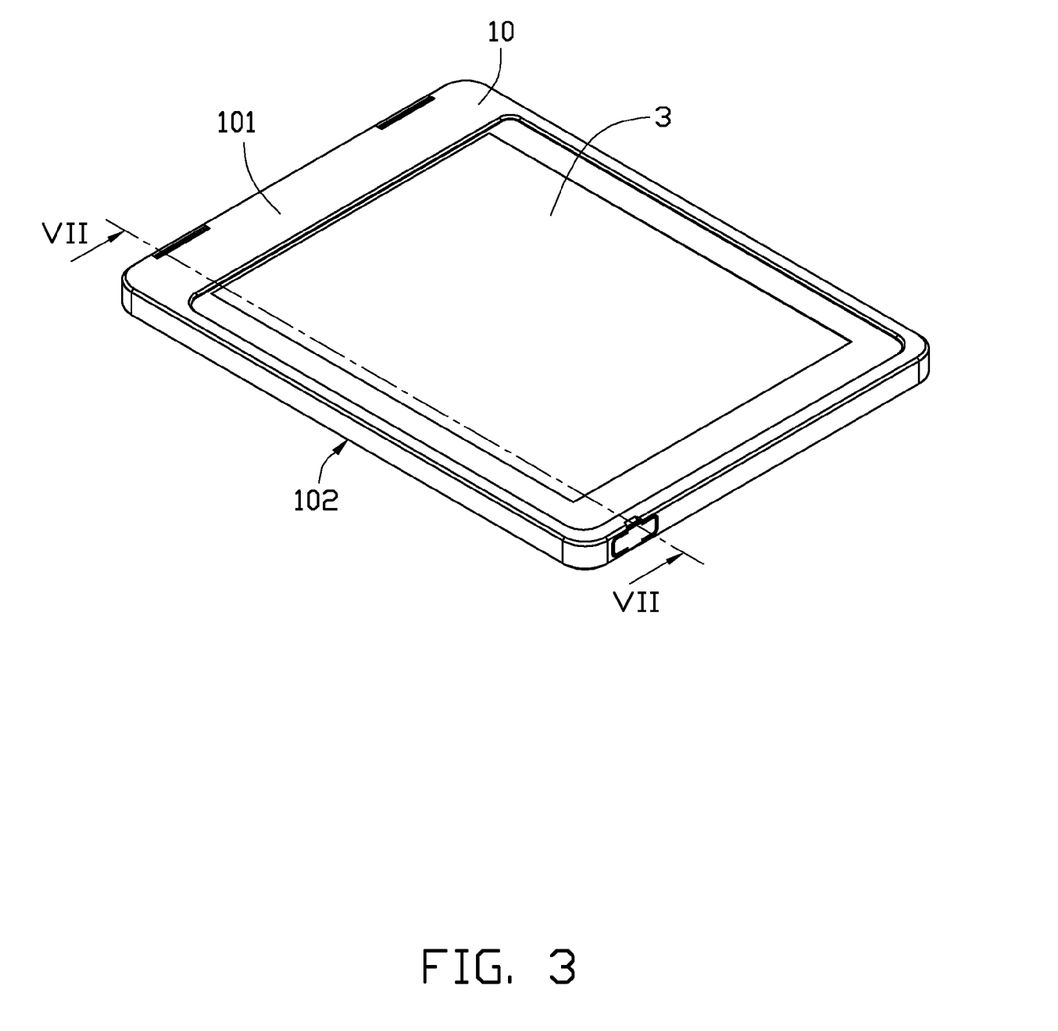
FIG. 3 is an isometric view of the protection case of FIG. 1 when the electronic device is accommodated in the protection case.

Referring to FIGS. 1 to 3, in one embodiment, a protection case 1 for an electronic device 3 includes a main body 10 and a number of plugs 20. The main body 10 defines a receiving cavity 105 for accommodating the electronic device 3 and a number of connecting holes 100 corresponding to a number of ports (not shown) on the electronic device 3, such as a power port, an audio jack, and an universal serial bus (USB) port. The shape of each connecting hole 100 matches with the type of plug 20 for which it is intended, and each shape of the plug 20 matches with a connecting hole 100. The plug 20 is insertable into the connecting hole 100 to prevent moisture and any other air-borne contaminants from entering into the electronic device 3 when accommodated in the protection case 1, when the port is not in use.

The main body 10 may be made of a resilient material, so that the size of the receiving cavity 105 can be stretched to adapt to different sizes. The original size of the receiving cavity 105 is slightly smaller than or the same size as the electronic device 3. When the electronic device 3 is accommodated into the receiving cavity 105, the receiving cavity 105 will be enlarged by the electronic device 3, and an interior surface of the receiving cavity 105 closely hugs an exterior surface of the electronic device 3. In one embodiment, the main body 10 is made of a soft resin which is resistant to electromagnetic interference or radiation (EMI/R), such as a vinyl acetate ethylene acetate polymerization, for preventing the entry or output of EMI/R in relation to the electronic device 3.

The main body 10 includes a first surface 101, a second surface 102 parallel to the first surface 101, and a sidewall 104 perpendicularly connected to the first surface 101 and the second surface 102. The first surface 101 defines an opening 1010 corresponding to a display screen 30 of the electronic device 3. The connecting holes 100 can be defined in the first surface 101, the second surface 102, and/or the sidewall 104. The main body 10 further defines a receiving groove 103 surrounding each of the connecting holes 100 whereby moisture can pass. The connecting holes 100 may be, but are not limited to, a number of first speaker through holes 1000, a pair of second speaker through holes 1001, a first interface through hole 1002 for exposing the USB port, and a second interface through hole 1003 for exposing the audio jack. The receiving grooves 103 may be, but are not limited to, a first receiving groove 1030 encircling the first speaker through hole 1000, and a second receiving groove 1031 encircling the first interface through hole 1002 and the second interface through hole 1003. The plugs 20 may be, but are not limited to, a pair of first plugs 201 for engaging with the second speaker through hole 1001 and a second plug 202 for engaging with the second receiving groove 1031.

Figure 5:
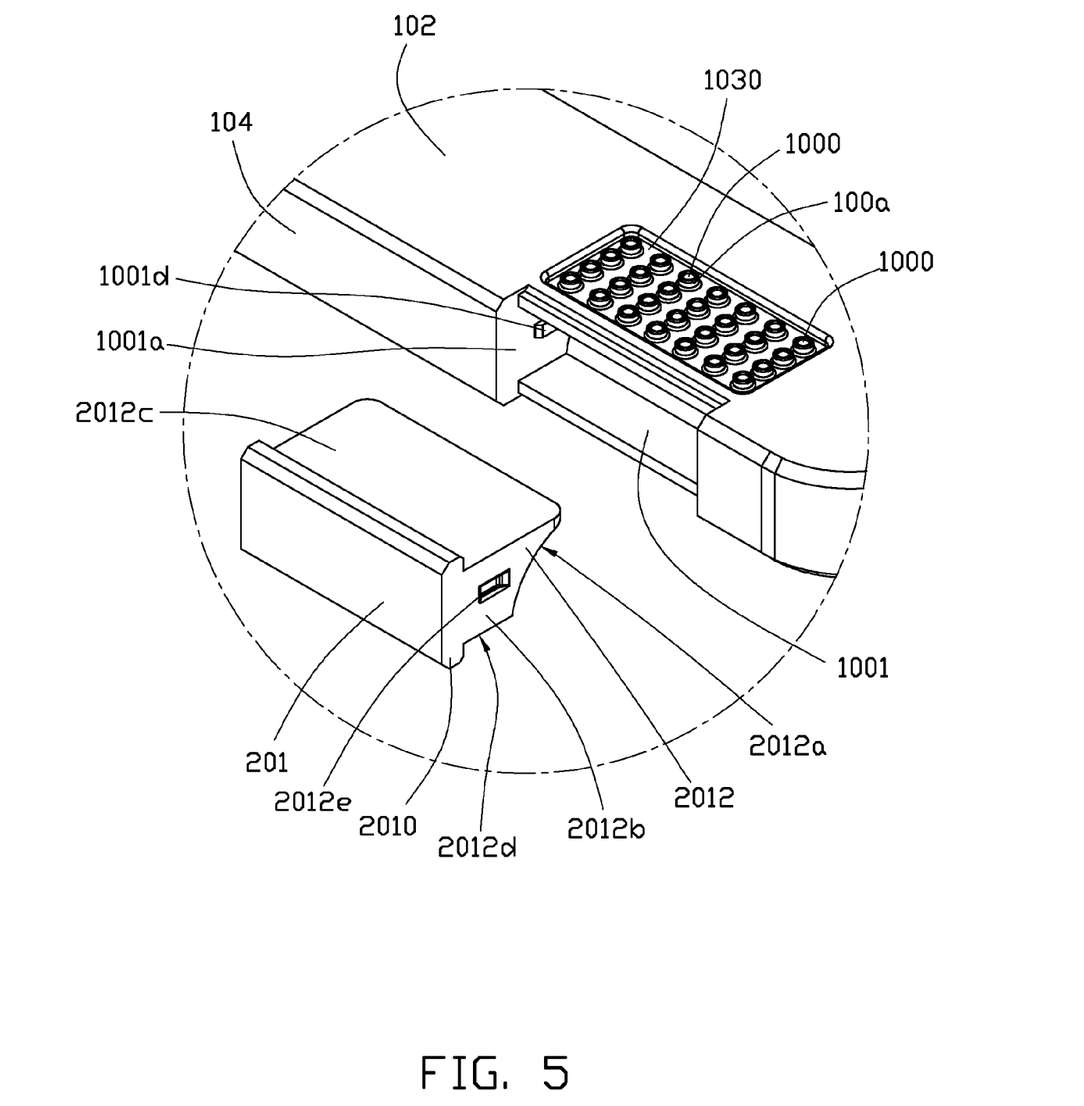
FIG. 5 is an enlarged, isometric view of a portion V of FIG. 2.
Figure 7:
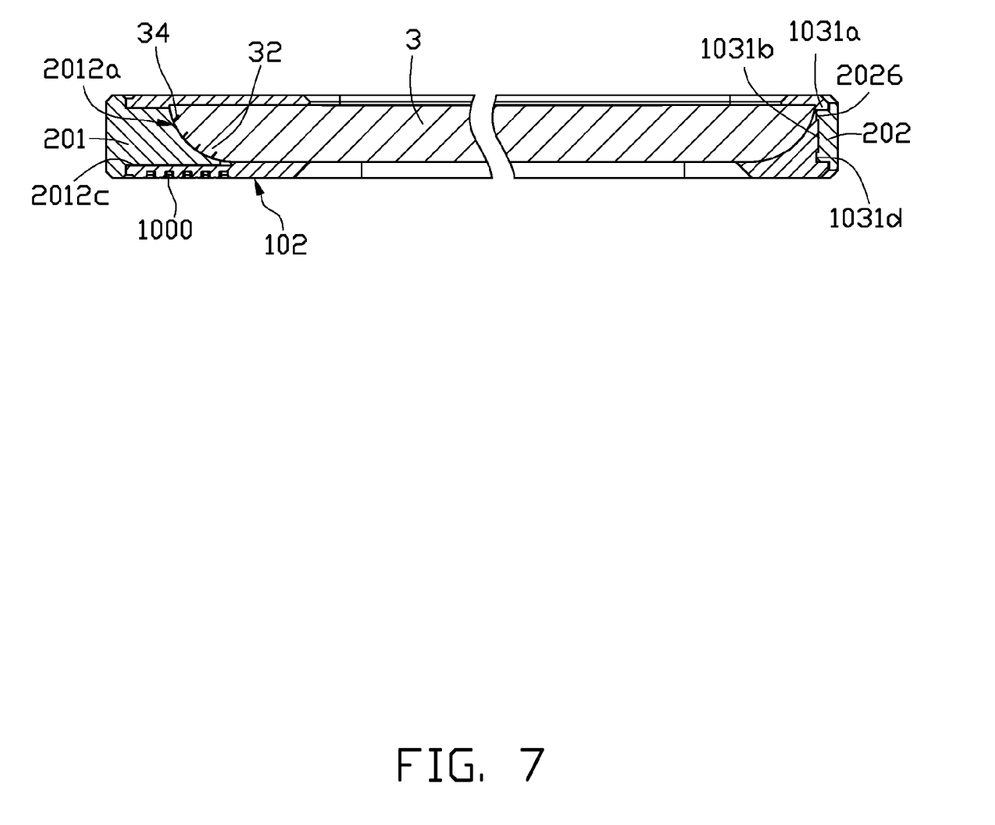
FIG. 7 is a cross-sectional, isometric view taken along the line VII-VII of FIG. 3.

Referring to FIGS. 5 and 7, the first receiving groove 1030 is defined in the second surface 102 and corresponds to a number of speakers 32 of the electronic device 3. A number of protrusions 100a are formed on a bottom surface of the first receiving groove 1030. The first speaker through holes 1000 are defined through each protrusion 100a so as to allow communication between the speaker 32 and the exterior of the protective cover 1. The second speaker through hole 1001 is defined in the sidewall 104 and also corresponds to the speaker 32 of the electronic device 3. The second speaker through hole 1001 communicates with the first speaker through holes 1000. The second speaker through hole 1001 includes a pair of parallel internal side surfaces 1001a. The internal side surfaces 1001a are perpendicular to the sidewall 104 and extend from the sidewall 104 to the receiving cavity 105. A pair of positioning projections 1001d are formed on each internal side surface 1001a.

The first plug 201 includes a base board 2010 and a plug body 2012 extending from the base board 2010. The plug body 2012 is substantially rectangular, and includes an end surface 2012a opposite to the base board 2010, a pair of parallel outer side surfaces 2012b, a top surface 2012c perpendicular to the outer side surface 2012b, and a bottom surface 2012d parallel to the top surface 2012c. The end surface 2012a is shaped to match the shape of the speaker 32 of the electronic device 3. The plug body 2012 defines a positioning dimple 2012e in each outer side surface 2012b. When the first plug 201 is inserted into the second speaker through hole 1001, the end surface 2012a is tightly attached on the speaker 32 to cover a number of holes 34 of the speaker 32. The top surface 2012c faces and covers the first speaker through holes 1000 formed in the second surface 102. The positioning projections 1001d is inserted into the positioning dimples 2012e in the internal side surfaces 1001a to fasten the first plugs 201 in the second speaker through holes 1001.

Figure 4:
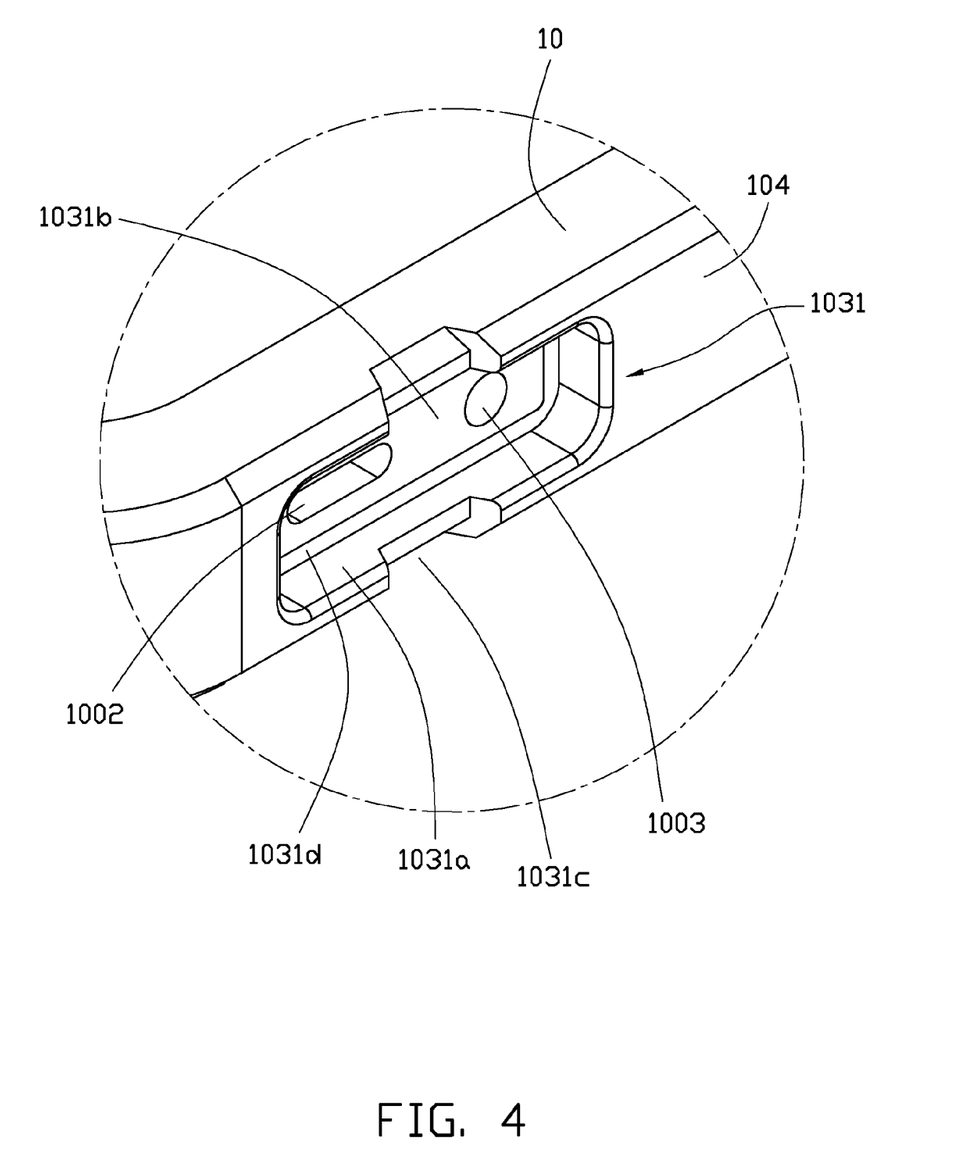
FIG. 4 is an enlarged, isometric view of a portion IV of FIG. 1.

Referring to FIGS. 4 and 7, the second receiving groove 1031 is defined in the sidewall 104 and corresponds to the USB port and the audio jack of the electronic device 3. The second receiving groove 1031 is substantially rectangular and includes an inner sidewall 1031a and a bottom wall 1031b perpendicular to the inner sidewall 1031a. The main body 10 defines a pair of positioning cutouts 1031c at two parallel longer peripheries of the inner sidewall 1031a. The first interface through hole 1002 and the second interface through hole 1003 are defined in the bottom wall 1031b. The main body 10 defines a receiving channel 1031d surrounding the first interface through hole 1002 and the second interface through hole 1003. In this embodiment, the first interface through hole 1002 is substantially rectangular. The second interface through hole 1003 is circular.

Figure 6:
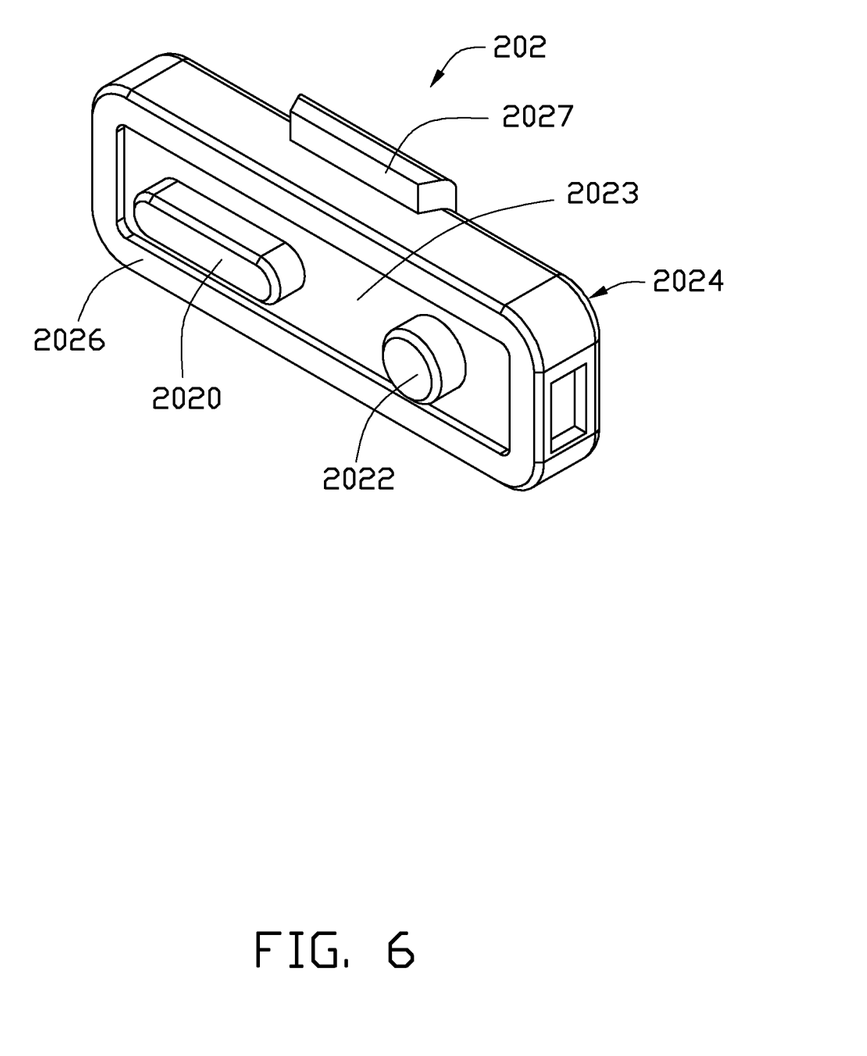
FIG. 6 is an isometric view of a second plug of the protection case of FIG. 1.

Referring to FIGS. 4 and 6, the second plug 202 is substantially rectangular and includes an inner wall 2023, an outer wall 2024 parallel to the inner wall 2023, a first protrusion 2020 for being engagably inserted into the first interface through hole 1002, and a second protrusion 2022 for being engagably inserted into the second interface through hole 1003. The second plug 202 forms a sealing protrusion 2026 extending along the periphery of the inner wall 2023. The sealing protrusion 2026 surrounds the first protrusion 2020 and the second protrusion 2022. The second plug 202 further forms a pair of positioning protrusions 2027 at the two longer peripheries of the outer wall 2024. When the second plug 202 is inserted into the second receiving groove 1031, the first protrusion 2020 is inserted into the first interface through hole 1002. The second protrusion 2022 is inserted into the second interface through hole 1003. The sealing protrusion 2026 is inserted into the receiving channel 1031d. The positioning protrusions 2027 are correspondingly inserted into the positioning cutouts 1031c to fasten the second plug 202 into the second receiving groove 1031.

Referring to FIGS. 1 and 2, the positions of the first receiving groove 1030 and the second receiving groove 1031, the quantity of the connecting holes 100 in the first receiving groove 1030 and the second receiving groove 1031, the shape of the connecting holes 100, and the structure of the plugs 20 can be changed according to the position and the shape of the ports and other parts of the electronic device 3.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A protection case for protecting an electronic device, the protection case comprising:
a main body, the main body defining a receiving cavity for accommodating the electronic device and a plurality of connecting holes for exposing a plurality of ports of the electronic device, the main body comprising a first surface, a second surface parallel to the first surface, and a sidewall perpendicularly connected to the first surface and the second surface;
wherein the main body defines a plurality of grooves encircling the connecting holes, the connecting holes comprise a plurality of first speaker through holes defined in the second surface and corresponding to a plurality of speakers of the electronic device, the grooves comprise a first receiving groove defined in the second surface, a plurality of speaker protrusions are formed on a bottom surface of the first receiving groove, the first speaker through holes are defined through the speaker protrusions.

2. The protection case of claim 1, wherein the connecting holes comprise a plurality of interface through holes, a second plug for engagably inserting into one of the grooves, the second plug comprising a plurality of protrusions corresponding to the interface through holes, and when the second plug is inserted into the one of the grooves, the protrusions are inserted into the corresponding interface through holes.

3. The protection case of claim 2, wherein the first surface defines an opening for exposing a display screen of the electronic device.

4. The protection case of claim 3, wherein the interface through holes comprise a first interface through hole for exposing a universal serial bus port of the electronic device and a second interface through hole for exposing an audio jack of the electronic device, the plurality of grooves further comprise a second receiving groove defined in the sidewall, and the first interface through hole and the second interface through hole are defined in the second receiving groove.

5. The protection case of claim 4, wherein the second plug is for sealing the second receiving groove, the second plug comprises an inner wall, an outer wall parallel to the inner wall, a first protrusion for engaging with the first interface through hole, and a second protrusion for engaging with the second interface through hole.

6. The protection case of claim 5, wherein the second receiving groove comprises an inner sidewall and a bottom wall perpendicular to the inner sidewall, the main body defines a pair of positioning cutouts correspondingly at two parallel peripheries of the inner sidewall, the second plug forms a pair of positioning protrusions at two peripheries of the outer wall, when the second plug is inserted into the second receiving groove, the positioning protrusions are correspondingly inserted into the positioning cutouts to fasten the second plug into the second receiving groove.

7. The protection case of claim 6, wherein the main body defines a receiving channel encircling the first interface through hole and the second interface through hole in the bottom wall, the second plug forms a sealing protrusion extending along the periphery of the inner wall and encircles the first protrusion and the second protrusion, when the second plug is inserted into the second receiving groove, the sealing protrusion is inserted into the receiving channel.

8. The protection case of claim 7, wherein the first interface through hole is substantially rectangular, the second interface through hole is circular.

9. The protection case of claim 8, wherein the main body is made of a soft resin which is resistant to electromagnetic interference or radiation.

10. The protection case of claim 1, wherein the connecting holes further comprise a plurality of second speaker through holes defined in the sidewall and corresponds to the speakers of the electronic device, each of the second speaker through holes communicate with a corresponding one of the first speaker through holes, the protection case further comprise a plurality of first plugs for engagably inserted into the second speaker through holes and breaking the communication between the speakers and the first speaker through holes, each of the first plugs comprises a base board and a plug body extending from the base board, the plug body defines a positioning dimple in a pair of parallel outer side surface of plug body.

11. The protection case of claim 10, wherein each of the second speaker through holes comprises a pair of parallel internal side surfaces, the internal side surfaces are perpendicular to the sidewall and extend from the sidewall to the receiving cavity, a pair of positioning projections are correspondingly formed on the internal side surfaces, the positioning projections are correspondingly inserted into the positioning dimples to fasten the first plugs in the second speaker through holes.

12. A case for protecting an electronic device, comprising:
   a main body covering at least a portion of the electronic device, the main body comprising a first surface, a second surface parallel to the first surface, and a sidewall perpendicularly connected to the first surface and the second surface;
   a plurality of connecting through holes defined in the main body corresponding to a plurality of speakers of the electronic device; and
   a groove defined in the second surface,
   wherein the connecting through holes is located in the groove, moisture existing in the air is gathered in the groove, a plurality of protrusions are formed on a bottom surface of the groove, the connecting through holes are defined through the protrusions.

13. The case of claim 12, wherein each protrusion is formed at a top end of a respective one of the connecting through holes.

* * * * *